United States Patent
Strahle

(10) Patent No.: US 10,569,162 B2
(45) Date of Patent: Feb. 25, 2020

(54) DETACHABLE JOYSTICK FOR VIDEO GAME CONTROLLER

(71) Applicant: Performance Designed Products LLC, San Diego, CA (US)

(72) Inventor: Bradley M. Strahle, Crestline, CA (US)

(73) Assignee: Performance Designed Products LLC, San Diego, CA (US)

( * ) Notice: Subject to any disclaimer, the term of this patent is extended or adjusted under 35 U.S.C. 154(b) by 0 days.

(21) Appl. No.: 16/573,818

(22) Filed: Sep. 17, 2019

(65) Prior Publication Data

US 2020/0009455 A1 Jan. 9, 2020

Related U.S. Application Data

(63) Continuation of application No. PCT/US2018/038540, filed on Jun. 20, 2018, which
(Continued)

(51) Int. Cl.
*A63F 9/24* (2006.01)
*A63F 13/00* (2014.01)
(Continued)

(52) U.S. Cl.
CPC .............. *A63F 13/24* (2014.09); *G05G 9/053* (2013.01); *A63F 2300/1043* (2013.01)

(58) Field of Classification Search
CPC ............ G07F 17/3264; G07F 17/3204; G07F 17/3209; A63F 13/24
See application file for complete search history.

(56) References Cited

U.S. PATENT DOCUMENTS 4,296,773 A * 10/1981 Harshman ........... F15B 13/0422
　　　　　　　　　　　　　　　　　　　　　137/312
4,492,830 A *  1/1985 Kim .................... G05G 9/04796
　　　　　　　　　　　　　　　　　　　　　200/5 R
(Continued)

FOREIGN PATENT DOCUMENTS

JP    2013-176457 A    9/2013
TW         496181       7/2002
WO   WO 09038483 A1   3/2009

OTHER PUBLICATIONS

International Search Report and Written Opinion dated Sep. 4, 2018, received in PCT Patent Application No. PCT/US2018/038540.

*Primary Examiner* — Kang Hu
*Assistant Examiner* — Jason Pinheiro
(74) *Attorney, Agent, or Firm* — Knobbe, Martens, Olson & Bear LLP

(57) ABSTRACT

A removable joystick for use with a video game controller includes a base shaft that is coupled to a joystick unit in the housing of the video game controller so that the proximal end of the base shaft extends to a location at or below an outer surface of the housing. A top shaft assembly is removably coupleable to the base shaft via a quick disconnect assembly. The top shaft assembly includes a top shaft with a proximal end that removably couples to a joystick ball, and a collar that is spring loaded and movably coupled to the top shaft and has a flange that extends outward from the outer surface of the collar. When the top shaft assembly is disconnected from the base shaft, the flange of the collar engages and retains a dust cover disposed over the collar to inhibit misplacement or loss of the dust cover.

21 Claims, 16 Drawing Sheets

Related U.S. Application Data is a continuation of application No. 15/692,744, filed on Aug. 31, 2017, now Pat. No. 10,272,327, and a continuation-in-part of application No. 15/649,014, filed on Jul. 13, 2017, now Pat. No. 10,183,218.

(51) Int. Cl.

| | |
|---|---|
| *G06F 17/00* | (2019.01) |
| *G06F 19/00* | (2018.01) |
| *A63F 13/24* | (2014.01) |
| *G05G 9/053* | (2006.01) |

(56) References Cited

U.S. PATENT DOCUMENTS

| | | | |
|---|---|---|---|
| 4,558,609 A * | 12/1985 | Kim | G05G 9/047 |
| | | | 74/471 XY |
| 4,721,834 A * | 1/1988 | Mark | G05G 9/04785 |
| | | | 200/6 A |
| 4,748,023 A * | 5/1988 | Tamas | A61K 9/2081 |
| | | | 424/465 |
| D297,952 S | 10/1988 | Ishiwata | |
| 4,857,881 A * | 8/1989 | Hayes | G05G 9/047 |
| | | | 338/128 |
| 4,870,389 A | 9/1989 | Ishiwata | |
| D307,921 S | 5/1990 | Barr | |
| D319,081 S | 8/1991 | Ishiwata | |
| 5,213,327 A | 5/1993 | Kitaue | |
| D351,870 S | 10/1994 | Leung | |
| D372,941 S | 8/1996 | Oikawa | |
| D375,765 S | 11/1996 | Kawasaki | |
| D387,094 S | 12/1997 | Muraki | |
| D389,198 S | 1/1998 | Hama | |
| 5,883,690 A | 3/1999 | Meyers | |
| D414,761 S | 10/1999 | Oikawa | |
| 6,085,608 A * | 7/2000 | Santoro, Jr. | G05G 9/047 |
| | | | 74/471 XY |
| 6,128,974 A * | 10/2000 | Hughes | F16H 61/702 |
| | | | 192/3.63 |
| 6,307,486 B1 | 10/2001 | Takeda | |
| D484,497 S | 12/2003 | Alviar | |
| D523,446 S | 6/2006 | Peng | |
| D529,493 S | 10/2006 | Ogasawara | |
| D568,884 S | 5/2008 | Kawanobe | |
| D579,931 S | 11/2008 | Chang | |
| 7,499,284 B2 | 3/2009 | Kawanobe | |
| D631,458 S | 1/2011 | Liao | |
| D634,317 S | 3/2011 | Buckle | |
| D635,954 S | 4/2011 | Aarras | |
| 8,044,934 B2 | 10/2011 | Arai | |
| D648,690 S | 11/2011 | Snodgrass | |
| D656,496 S | 3/2012 | Andre | |
| 8,224,589 B2 * | 7/2012 | Verseput | G06F 17/50 |
| | | | 435/6.1 |
| D665,734 S | 8/2012 | Fitch | |
| D678,191 S | 3/2013 | Fitch | |
| D681,056 S | 4/2013 | Akana | |
| D681,127 S | 4/2013 | Ashida | |
| 8,446,711 B2 | 5/2013 | Liao | |
| D701,851 S | 4/2014 | Bae | |
| D702,771 S | 4/2014 | Mar | |
| D713,421 S | 9/2014 | Kaneta | |
| 9,242,722 B2 * | 1/2016 | Buoy | G05G 9/047 |
| D763,359 S | 8/2016 | Kwong | |
| D783,722 S | 4/2017 | Peng | |
| D785,585 S | 5/2017 | Ismail | |
| 9,710,072 B1 | 7/2017 | Strahle | |
| D808,959 S | 1/2018 | Akana | |
| D808,972 S | 1/2018 | Magi | |
| D809,896 S | 2/2018 | Gokcebay | |
| D813,874 S | 3/2018 | Magi | |
| D816,663 S | 5/2018 | Lee | |
| D819,642 S | 6/2018 | Ehara | |
| D829,719 S | 10/2018 | Shim | |
| D839,216 S | 1/2019 | Kim | |
| 10,183,218 B1 | 1/2019 | Strahle | |
| D847,811 S | 5/2019 | Shim | |
| D848,418 S | 5/2019 | Jun | |
| D860,523 S | 9/2019 | Cheung | |
| 2004/0190192 A1 | 9/2004 | Huang | |
| 2005/0041387 A1 | 2/2005 | Lee | |
| 2007/0262959 A1 * | 11/2007 | Gu | G05G 9/047 |
| | | | 345/161 |
| 2008/0158808 A1 | 7/2008 | Camarena | |
| 2009/0009953 A1 | 1/2009 | Lin | |
| 2010/0134961 A1 | 6/2010 | Huang | |
| 2013/0033434 A1 | 2/2013 | Richardson | |
| 2013/0222293 A1 | 8/2013 | Chung | |
| 2013/0300697 A1 | 11/2013 | Kim | |
| 2016/0361634 A1 | 12/2016 | Gassoway | |

* cited by examiner

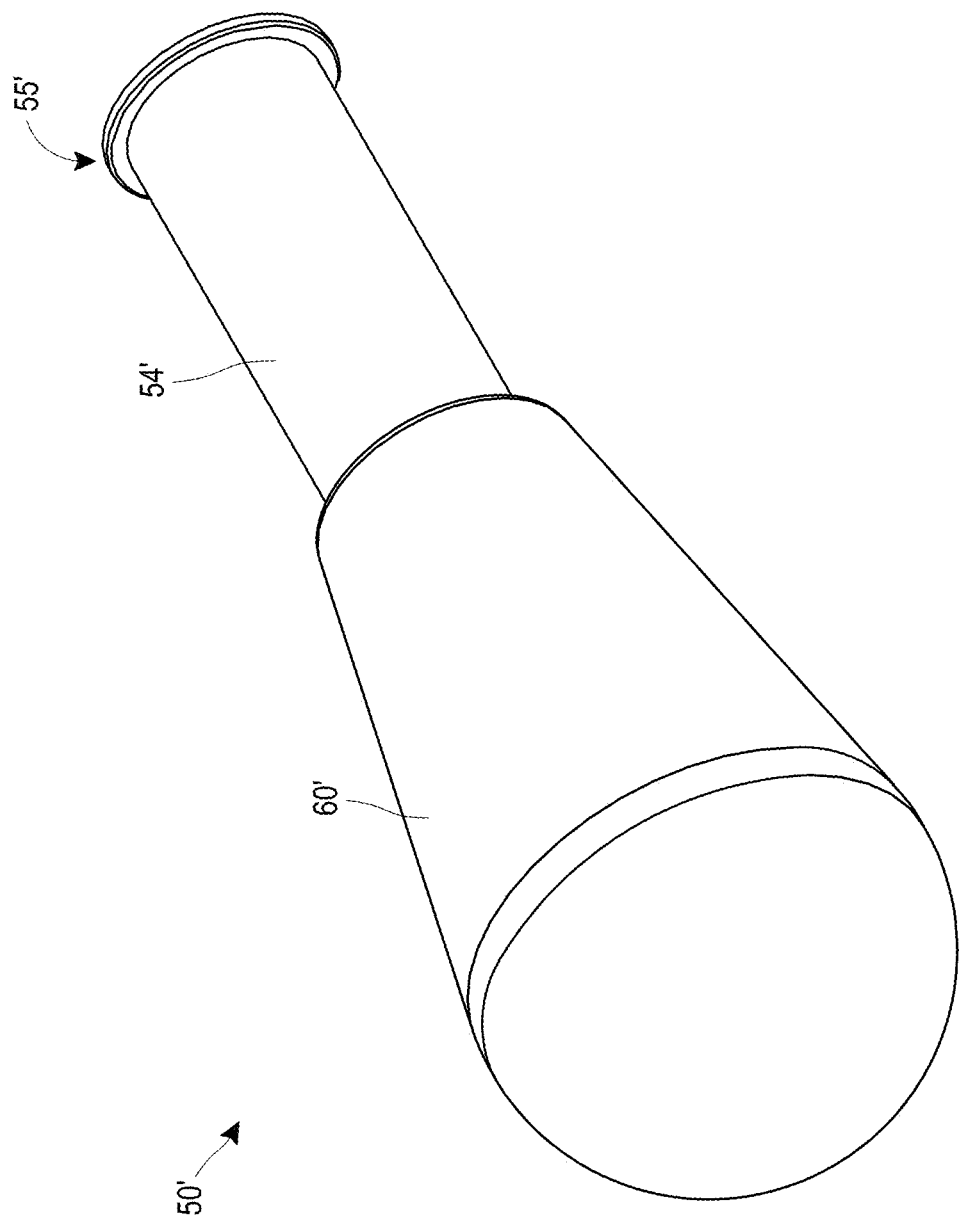

DETACHABLE JOYSTICK FOR VIDEO GAME CONTROLLER

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a continuation of PCT Application No. PCT/US2018/038540 filed Jun. 20, 2018, which claims priority to U.S. patent application Ser. No. 15/649,014 filed Jul. 13, 2017 and U.S. patent application Ser. No. 15/692,744 filed Aug. 31, 2017, the entire contents of both of which are incorporated herein by reference.

BACKGROUND

Field

The present invention is directed to video game controllers, and more particularly to a video game controller with a detachable joystick.

Description of the Related Art

Video gaming is very popular and has become increasingly complex, requiring video game controllers with multiple inputs (e.g., buttons, joysticks) that can be actuated (e.g., pressed, pivoted, etc.) to activate functions within the video game. As the inputs are actuated, electrical signals are generated, processed and/or transmitted to a gaming console to which the controller connects. The console operates the video game at least in part based on the signals it receives from the controller. There are different gaming consoles in the market, and each console may use a different type of controller (e.g., having different types or combination of inputs) or accommodate the use of multiple types of controllers.

Some game controllers are designed for particular use in fighting games or arcade style games. Such controllers can have an arcade like joy stick and multiple buttons, and a base or housing that allows the user to optionally rest his or her wrists on the housing of the controller while actuating the controls (e.g., the joy stick and/or buttons). Though such controllers are portable, they are often much larger than typical hand held controllers and the joystick that sticks out of the body of the controller makes it difficult to store the controller when traveling as it does not easily fit in a typical backpack, messenger bag or suitcase. Moreover, when placed in a travel bag (e.g., back pack, messenger bag, suitcase), the joystick sticking out of the controller housing can result in pressure exerted on the joystick head, which can result in damage to the joystick and/or the controller. To address these problems, removable joysticks have been developed for use with such controllers, to allow the controller to better fit in a travel bag. However, such removable joysticks are still deficient. For example, the dust cover is not retained when the joystick is removed, which results in the dust cover being misplaced or lost, which can negatively affect the operation of the controller (e.g., due to ingress of dust, liquid or other matter into the controller via the opening the dust cover normally covers, which can cause the joystick actuator to malfunction or fail.

SUMMARY

Accordingly, there is a need for an improved video game controller with a removable joystick that solves the problems discussed above.

In accordance with one aspect, a removable joystick for use with a video game controller is provided. The removable joystick includes a base shaft coupleable to a joystick unit in the video game controller. The removable joystick also comprises a top shaft assembly removably coupleable to the base shaft. The top shaft assembly includes a top shaft with a proximal end that optionally removably couples to a joystick ball. The top shaft assembly also includes a collar that is spring loaded and movably coupled to the top shaft and has a flange that extends outward from the outer surface of the collar. The top shaft assembly removably couples to the base shaft via a quick disconnect connection (e.g., ball-lock connection). When the top shaft assembly is disconnected from the base shaft, the flange of the collar engages and retains a dust cover disposed over the collar to inhibit misplacement or loss of the dust cover. This assembly facilitates travel with the video game controller by allowing decoupling of the joystick while preventing misplacement or loss of the dust cover.

In accordance with another aspect, a removable joystick assembly for use with a video game controller is provided. The removable joystick assembly comprises a base shaft with a circumferential recess at a proximal end of the base shaft and a top shaft assembly removably coupleable to the base shaft. The top shaft assembly comprises a top shaft having a central bore and comprising a threaded proximal end configured to removably couple to a joystick ball, a circumferential slot at a location between the proximal end and a distal end of the top shaft configured to removably receive a clip, and a plurality of openings defined in a distal wall portion of the top shaft that are configured to movably retain metal balls therein. The top shaft assembly also comprises a collar movably coupled over the top shaft by a spring disposed between the clip on the top shaft and an inner shoulder in the collar. The collar comprises a proximal inner surface with a first diameter that defines an annular gap between the top shaft and the collar that receives the spring, the first diameter being greater than a diameter of an outer surface of the top shaft. The collar also comprises an intermediate inner surface with a second diameter different than the first diameter and configured to contact an outer surface of the top shaft at the location of the plurality of openings to bias the balls in the openings radially inward relative to the distal wall portion of the top shaft. The collar also comprises a distal inner surface with a third diameter greater than the second diameter and configured to be spaced from an outer surface of the top shaft at the location of the plurality of openings to allow the balls in the openings to more radially outward relative to the distal wall portion of the top shaft. The collar also comprises a flange extending radially outward from a distal portion of the collar. The spring biases the collar toward a distal position where the intermediate inner surface biases the balls in the openings radially inward and into the circumferential recess of the base shaft to couple the top shaft assembly and the base shaft. When the collar is pulled proximally, the distal inner surface is spaced from the plurality of openings so that the balls move radially out of the circumferential recess thereby decoupling the top shaft assembly from the base shaft. The flange on the collar is configured to engage a dust cover disposed over collar to retain the dust cover when the top shaft assembly is decoupled from the base shaft.

In accordance with another aspect, a kit for a removable joystick assembly for use with a video game controller is provided. The kit comprises a base shaft with a circumferential recess at a proximal end of the base shaft, and a top shaft assembly removably coupleable to the base shaft. The top shaft assembly comprises a top shaft having a threaded proximal end, a circumferential slot at a location between the threaded proximal end and a distal end of the top shaft having a clip disposed therein, a plurality of openings defined in a distal wall portion of the top shaft, and a plurality of metal balls movably retained in the plurality of openings. The top shaft assembly also comprises a collar movably coupled over the top shaft, a spring disposed between the clip on the top shaft and an inner shoulder in the collar to allow spring loaded movement of the collar relative to the top shaft between a distal position and a proximal position, the collar having a flange extending radially outward from a distal portion of the collar. The spring is configured to bias the collar toward a distal position so that the collar biases the balls in the openings radially inward and into the circumferential recess of the base shaft to intercouple the top shaft and the base shaft. When the collar is pulled proximally, an inner surface of the collar is spaced from the plurality of openings so that the balls move radially out of the circumferential recess to decouple the top shaft assembly from the base shaft. The flange is configured to engage a dust cover disposed over collar to retain the dust cover when the top shaft assembly is decoupled from the base shaft.

In accordance with another aspect, a video game controller and a removable joystick assembly are provided in combination. A base shaft has a circumferential recess at a proximal end of the base shaft and a distal end coupled to a joystick unit in the housing of the video game controller. A top shaft assembly is removably coupleable to the base shaft. The top shaft assembly comprises a top shaft having a threaded proximal end removably coupleable to a joystick ball, a circumferential slot at a location between the threaded proximal end and a distal end of the top shaft having a clip disposed therein, a plurality of openings defined in a distal wall portion of the top shaft, and a plurality of metal balls movably retained in the plurality of openings. The top shaft assembly also comprises a collar movably coupled over the top shaft, a spring disposed between the clip on the top shaft and an inner shoulder in the collar to allow spring loaded movement of the collar relative to the top shaft between a distal position and a proximal position, the collar having a flange extending radially outward from a distal portion of the collar. The spring is configured to bias the collar toward a distal position so that the collar biases the balls in the openings radially inward and into the circumferential recess of the base shaft to intercouple the top shaft and the base shaft. When the collar is pulled proximally, an inner surface of the collar is spaced from the plurality of openings so that the balls move radially out of the circumferential recess to decouple the top shaft assembly from the base shaft. The flange is configured to engage a dust cover disposed over collar to retain the dust cover when the top shaft assembly is decoupled from the base shaft, a proximal end of the base shaft disposed at or below a top surface of the housing.

BRIEF DESCRIPTION OF THE DRAWINGS

FIG. 9A is a perspective view of another joystick assembly.

DETAILED DESCRIPTION

Figure 1:
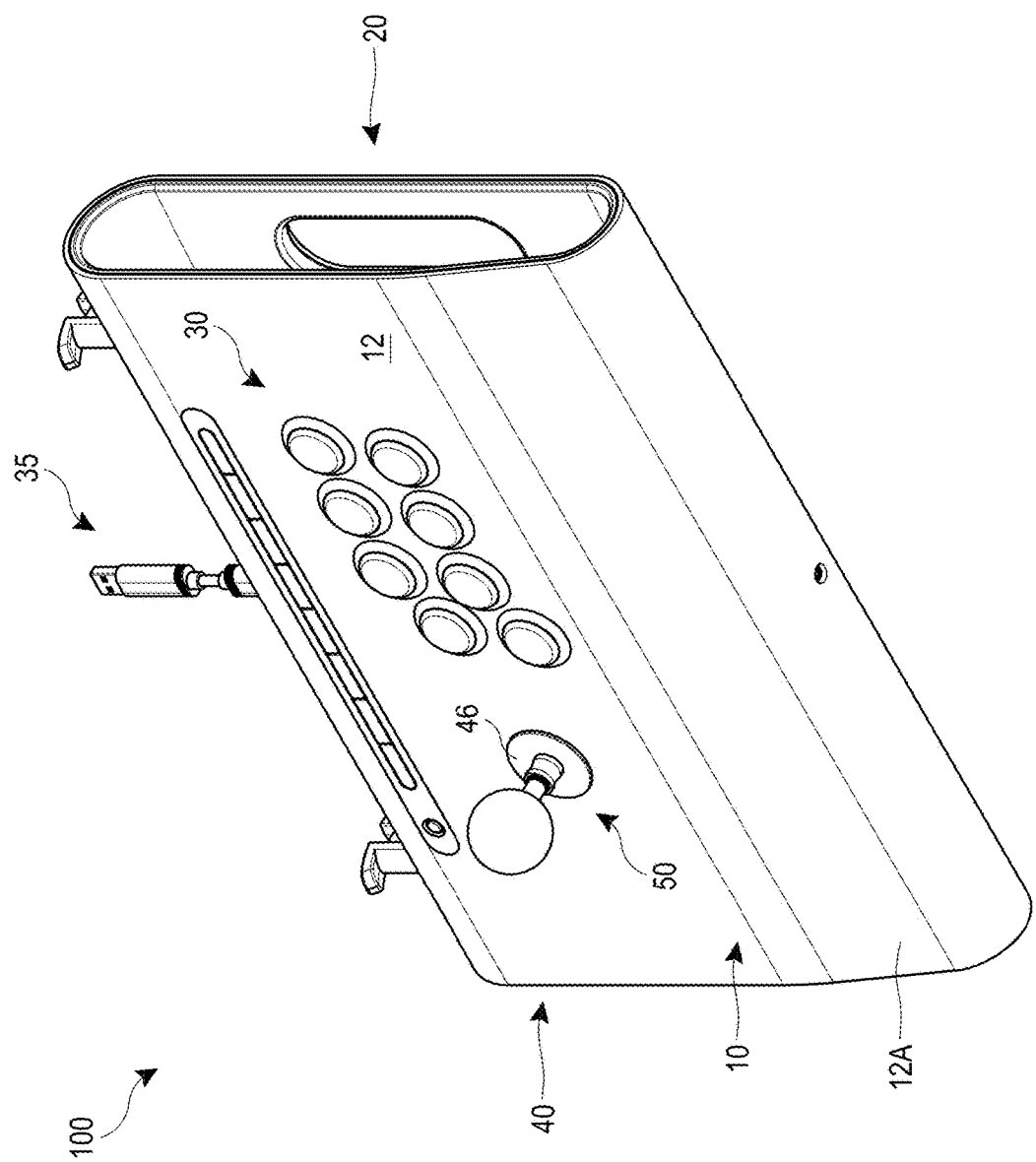
FIG. 1 is a top perspective view of a video game controller including a removable joystick.
Figure 2:
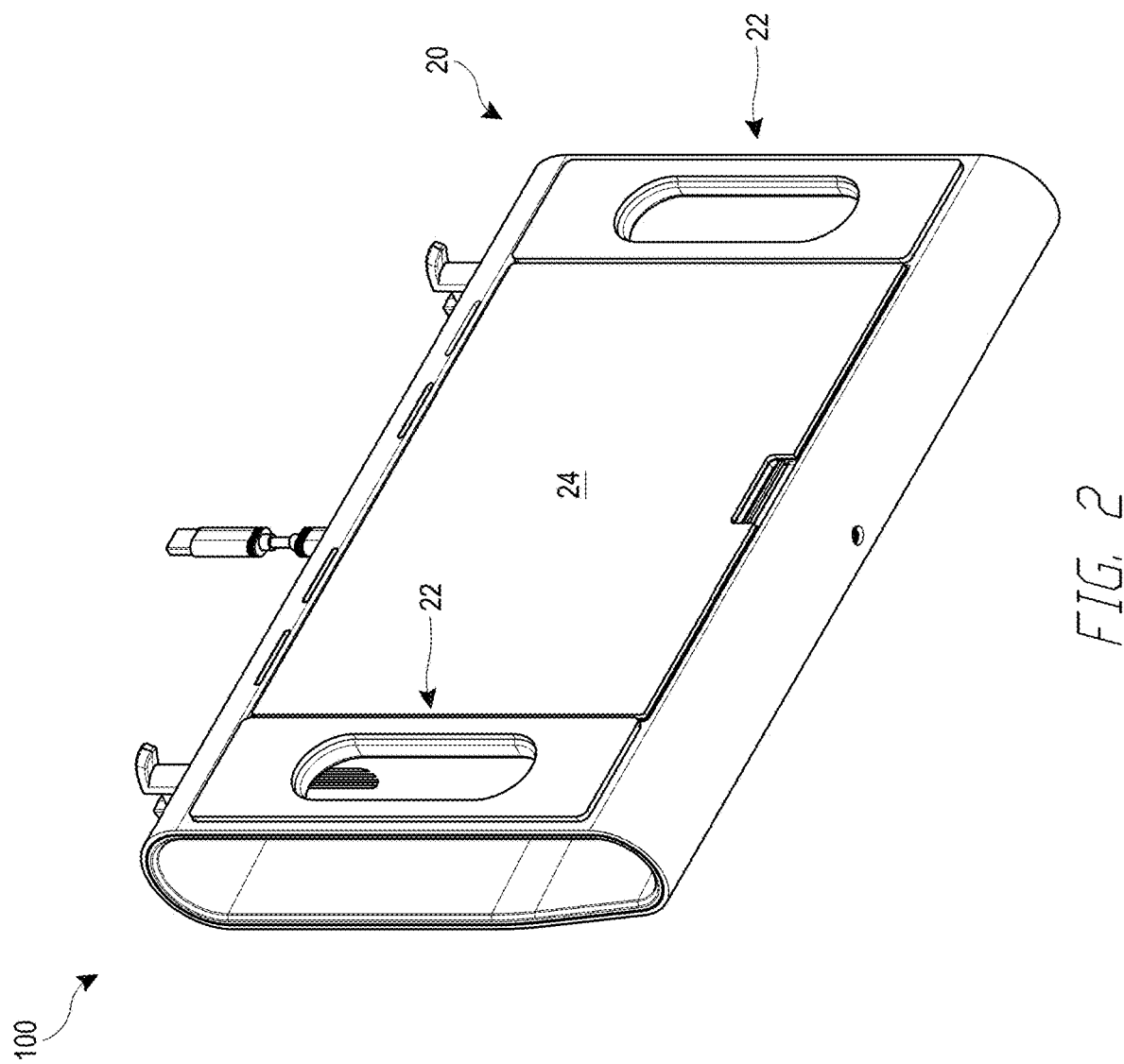
FIG. 2 is a bottom perspective view of the video game controller of FIG. 1.
Figure 3:
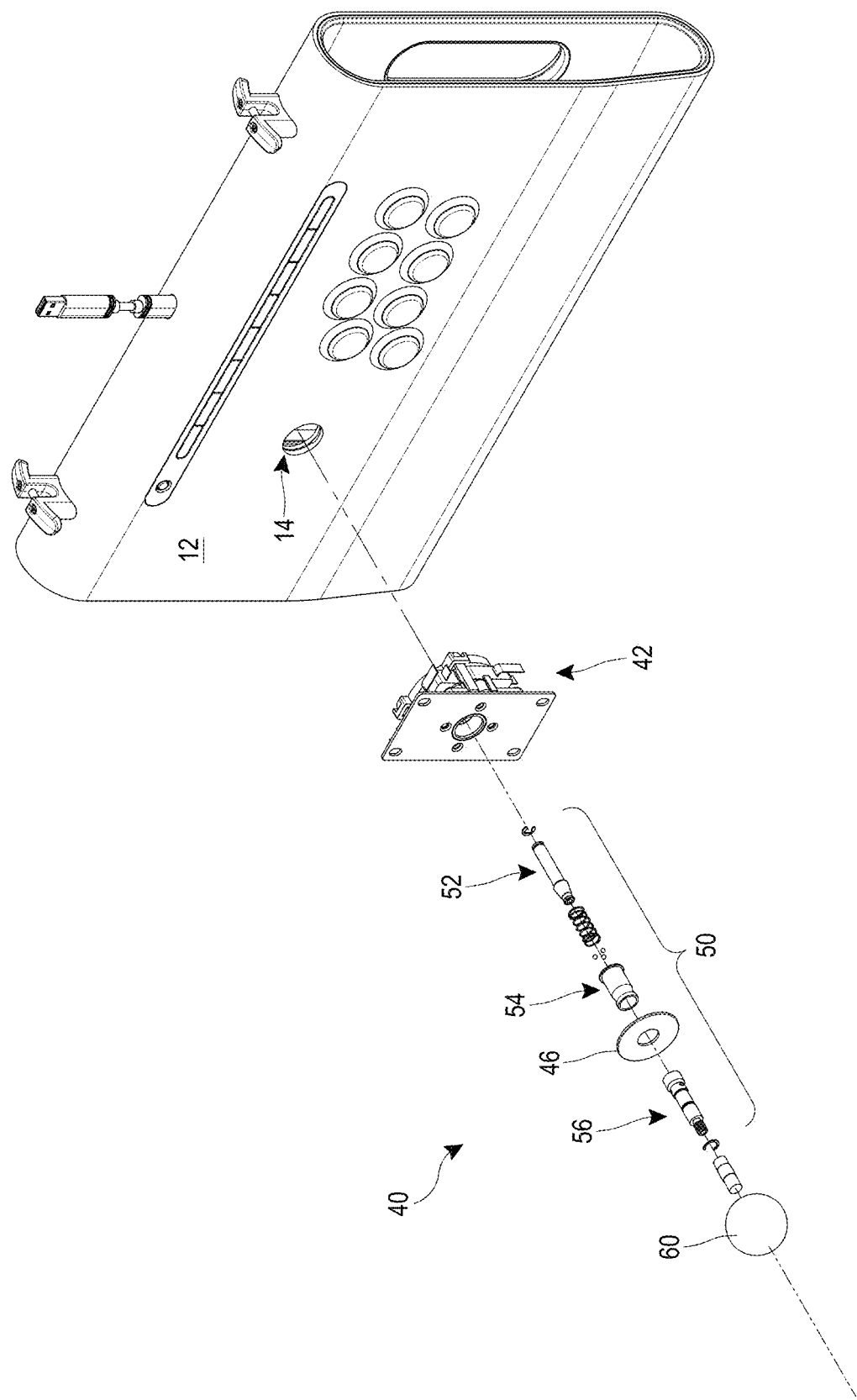
FIG. 3 is an exploded view of the video game controller of FIG. 1.

FIGS. 1-3 show a video game controller 100 (the "controller 100") that can be removably coupled to a video game unit (e.g., video game console), via a connector 35 (e.g., which can optionally couple to a cable that couples to a video game console). The video game controller 100 can be used with fight video games or arcade style video games. The controller 100 has a housing 10 with a top surface 12 that has a portion 12a on which the user can optionally rests their wrists while operating the controller 100. The controller 100 can also have a rear surface 20 and optionally have one or more handles 22 defined (e.g., by openings) in the rear surface 20 with which the user can grab the housing 10. The rear surface 20 can also optionally have a removable bottom cover 24 to access the electronics in the housing 10. Optionally, the bottom cover 24 is pivotally coupled to the housing 10 of the controller 100 with one or more hinges 25 (see FIG. 11A) that allow the bottom cover 24 to be moved between an open position and a closed position relative to the housing 10. A latch 26 (see FIG. 11A) can be actuated to lock and unlock the cover 24 relative to the housing 10.

The controller 100 can optionally have one or more buttons 30 on the top surface 12 for actuating one or more functions of the video game during operation. The controller 100 can also have a joystick unit 40 that includes a joystick assembly 50. The user can pivot the joystick assembly 50 to actuate a function of the video game during operation. A dust cover 46 is disposed about the joystick assembly 50 and adjacent the top surface 12 of the housing 10. The dust cover 12 covers an opening 14 in the housing 10 within which the joystick assembly 50 pivots to inhibit ingress of dust and foreign material into the housing 10 via the opening 14.

Figure 4:
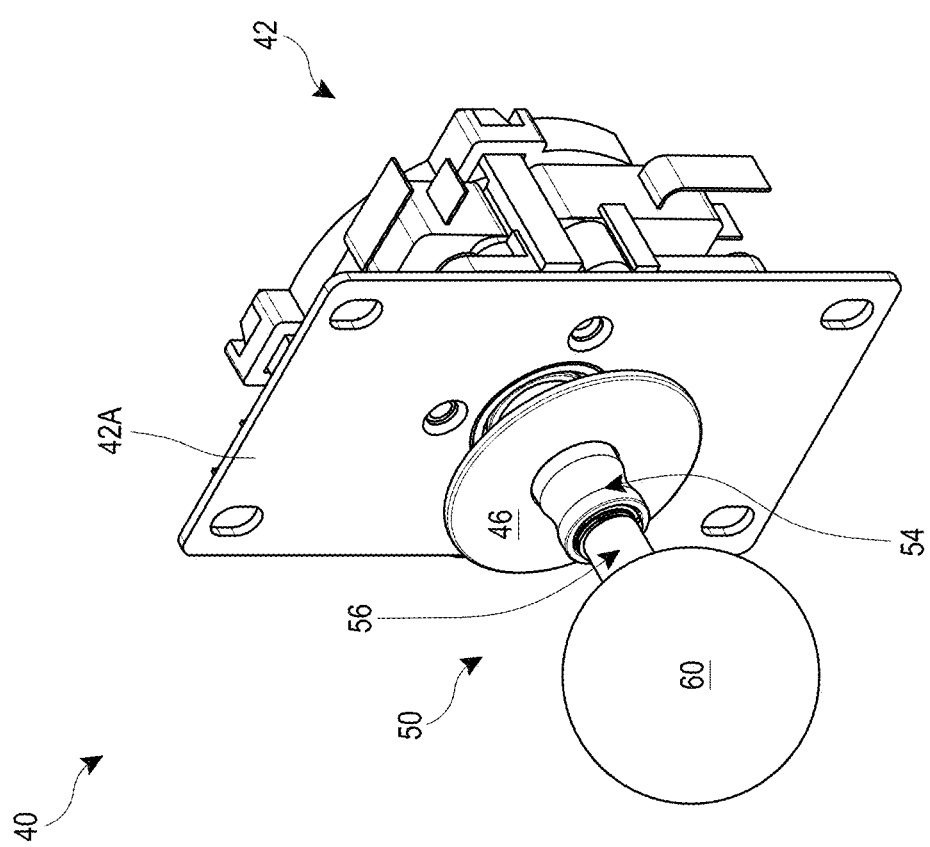
FIG. 4 is a perspective view of the removable joystick assembly attached to the joystick actuator.
Figure 5:
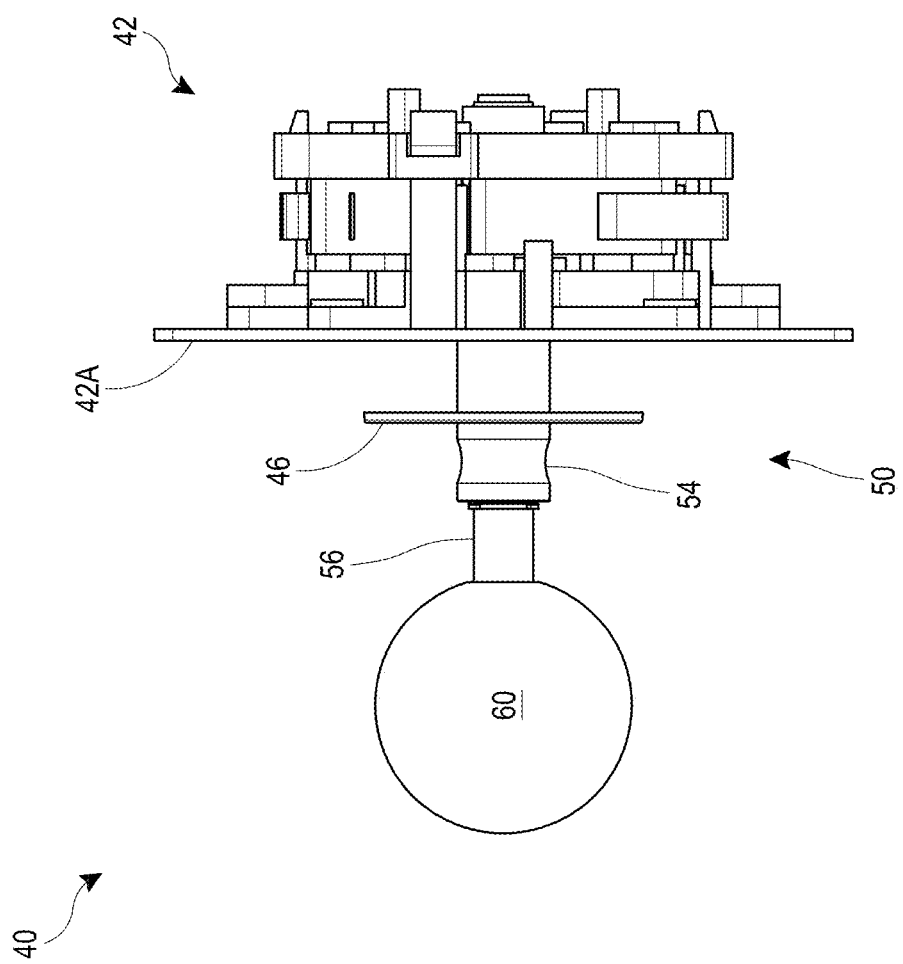
FIG. 5 is a side view of the removable joystick assembly attached to the joystick actuator.
Figure 6:
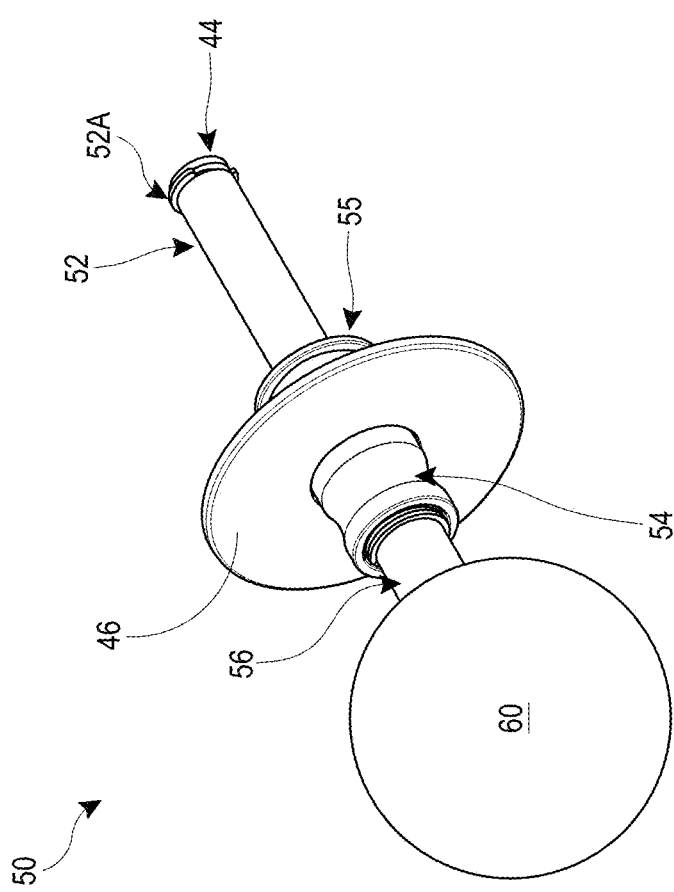
FIG. 6 is a perspective view of the joystick assembly.
Figure 7:
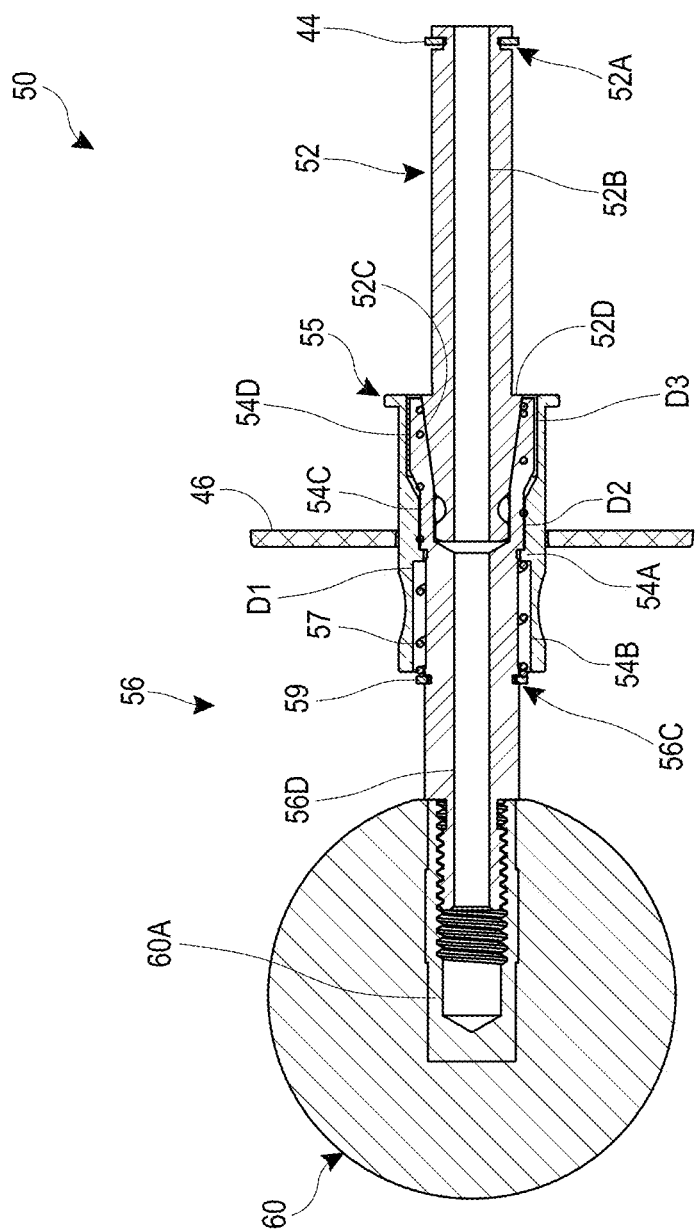
FIG. 7 is a cross-sectional side view of the joystick assembly.
Figure 8:
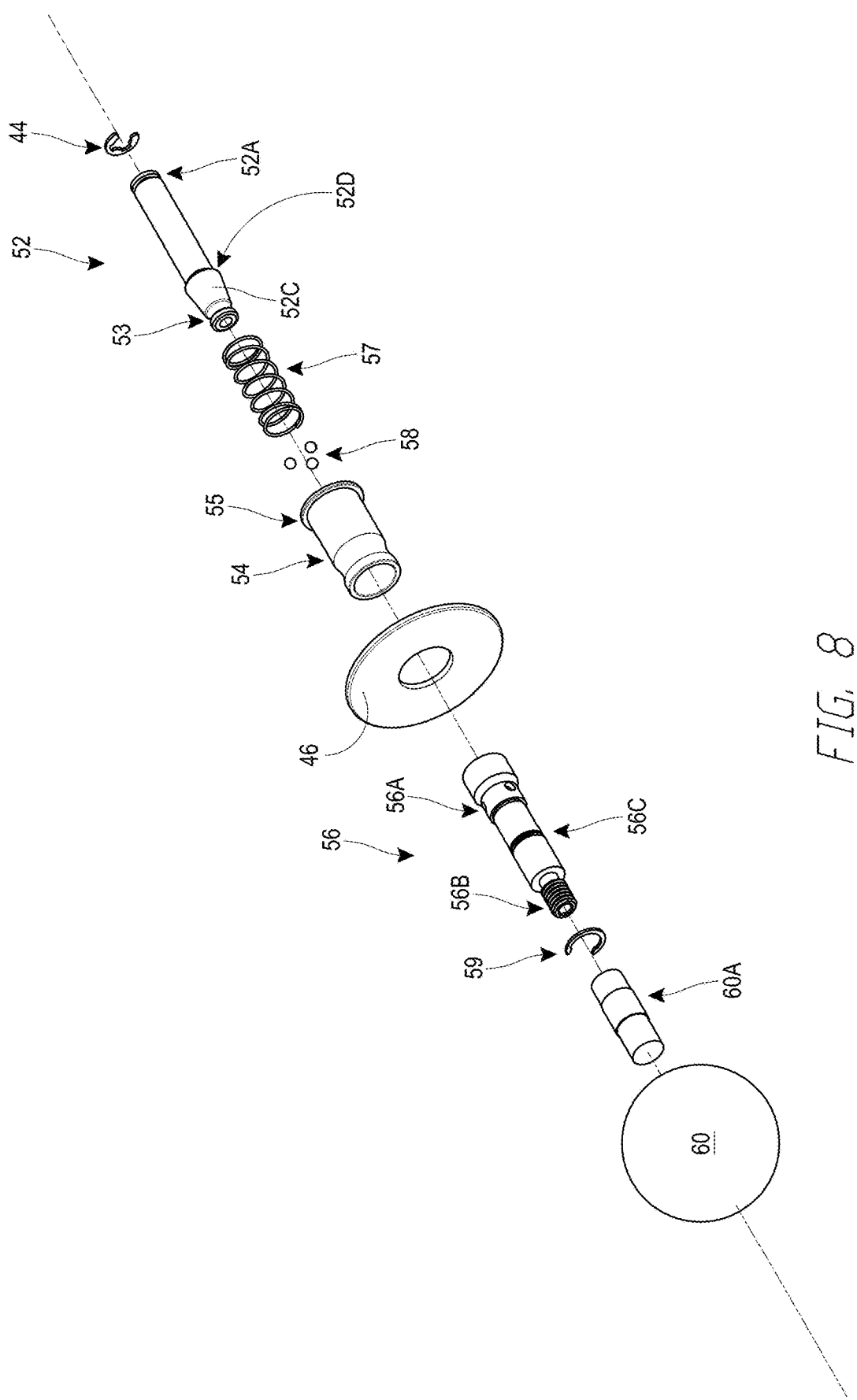
FIG. 8 is an exploded view of the joystick assembly.

FIGS. 3-5 show the joystick unit 40 in greater detail. The joystick unit 40 includes an actuator 42 that is disposed in the housing 10. The actuator 42 has a mounting plate 42a that can be coupled to the housing so that the mounting plate 42a faces an underside of the top surface 12 (e.g., the mounting plate 42*a* is fastened to an underside of the top surface 12). The joystick unit 40 also includes a joystick assembly 50 that couples to the actuator 42. The joystick assembly 50 is also illustrated in FIGS. 6-8.

The joystick assembly 50 includes a base shaft 52 that can be coupled to the actuator 42 with a clip 44 (e.g., e-clip) that extends in a slot 52A at a distal end of the base shaft 52. The base shaft 52 can have a bore 52B that extends along its length, and can also have a circumferential recess 53 near a proximal end of the base shaft 52. The base shaft 52 can have a conical surface 52C adjacent the circumferential recess 53 that extends to a shoulder 52D.

The joystick assembly 50 also includes a collar 54 with a flange 55, where the collar 54 is movably mounted onto a top shaft 56 to define a quick release or quick disconnect fitting (e.g., a ball-lock quick disconnect). The flange 55 can optionally extend radially outward from the collar 54 by a distance of between about 0.5 mm and about 3 mm, such as about 1 mm or about 1.2 mm. The collar 54 can have a shoulder 54A that extends radially inward from an inner surface of the collar 54, a proximal cylindrical section 54B with a first inner diameter D1, an intermediate cylindrical section 54C with a second inner diameter D2, and a distal cylindrical section 54C with a third inner diameter D3. Diameter D1 and Diameter D3 are greater than diameter D2, and diameter D3 is optionally greater than diameter D1.

A spring 57 can be disposed over at least a portion of the top shaft 56 and between the top shaft 56 and the collar 54 and allows the collar 54 to be spring loaded relatively to the top shaft 56. As best shown in FIG. 7, the spring 57 is disposed between a clip (e.g., e-clip) 59 disposed in a recess 56C of the top shaft 56 and the shoulder 54A of the collar 54. The collar 54 can move from a distal biased position to a proximal position to allow the top shaft 56 to decouple from the base shaft 52. The top shaft 56 can have a central bore 56D with one or more openings 56A that movably retain metal balls 58 therein, allowing them to move radially by a certain amount that allows the top shaft 56 to couple to and decouple from the base shaft 52, as further described below. The top shaft 56 can also have a threaded portion 56B that removably threads on to a ball 60 (e.g., threads into a threaded portion 60A of the ball 60).

In use, when the collar 54 is in the biased position and the top shaft 56 is disposed over at least a portion of the base shaft 52, the balls 58 slide into the circumferential recess 53 of the base shaft 52 to intercouple the top shaft 56 to the base shaft 52. When the collar 54 is slid toward the proximal position (acting against the spring force), the intermediate cylindrical section 54C slides out of contact with the surface of the top shaft 56, allowing the balls 58 to move at least partially into the openings 56A in the top shaft 56 and out of the circumferential recess 53 of the base shaft 52 as the top shaft 56 is pulled away from the base shaft 52. Therefore, the top shaft 56, with the ball 60 attached thereto, and the collar 54 can be decoupled from the base shaft 52 to facilitate travel of the controller 100. Optionally, when the collar 54 and top shaft 56 are decoupled from the base shaft 52, the base shaft 52 does not protrude from the opening 14 of the housing 10 (e.g., the base shaft 52 extends to a proximal end that is at or below a plane of the top surface 12), thereby making it easy for the controller 100 to fit into a back pack, travel bag or suitcase and inhibit damage to the controller 100 or joystick during travel.

Advantageously, as the collar 54 and top shaft 56 are decoupled from the base shaft 52, the flange 55 of the collar 54 engages a surface of the dust cover 46 so that the dust cover 46 is retained on the collar 54. This advantageously inhibits (e.g., prevents) the misplacement or loss of the dust cover 46 while the top shaft 56 and collar 54 are decoupled from the base shaft 52, such as during storage or travel of the controller 100.

Figure 9B:
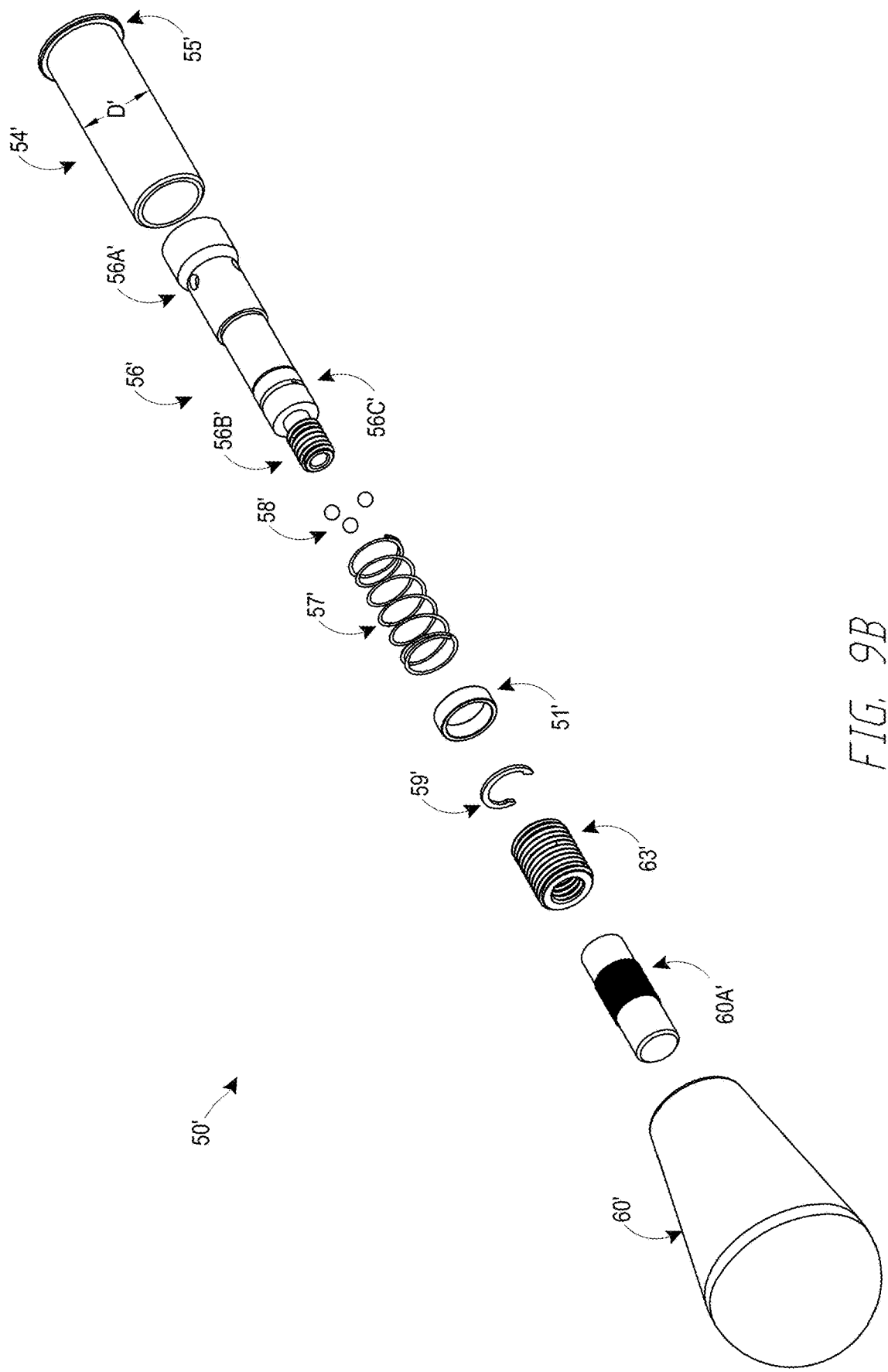
FIG. 9B is an exploded view of the joystick assembly of FIG. 9A.
Figure 9C:
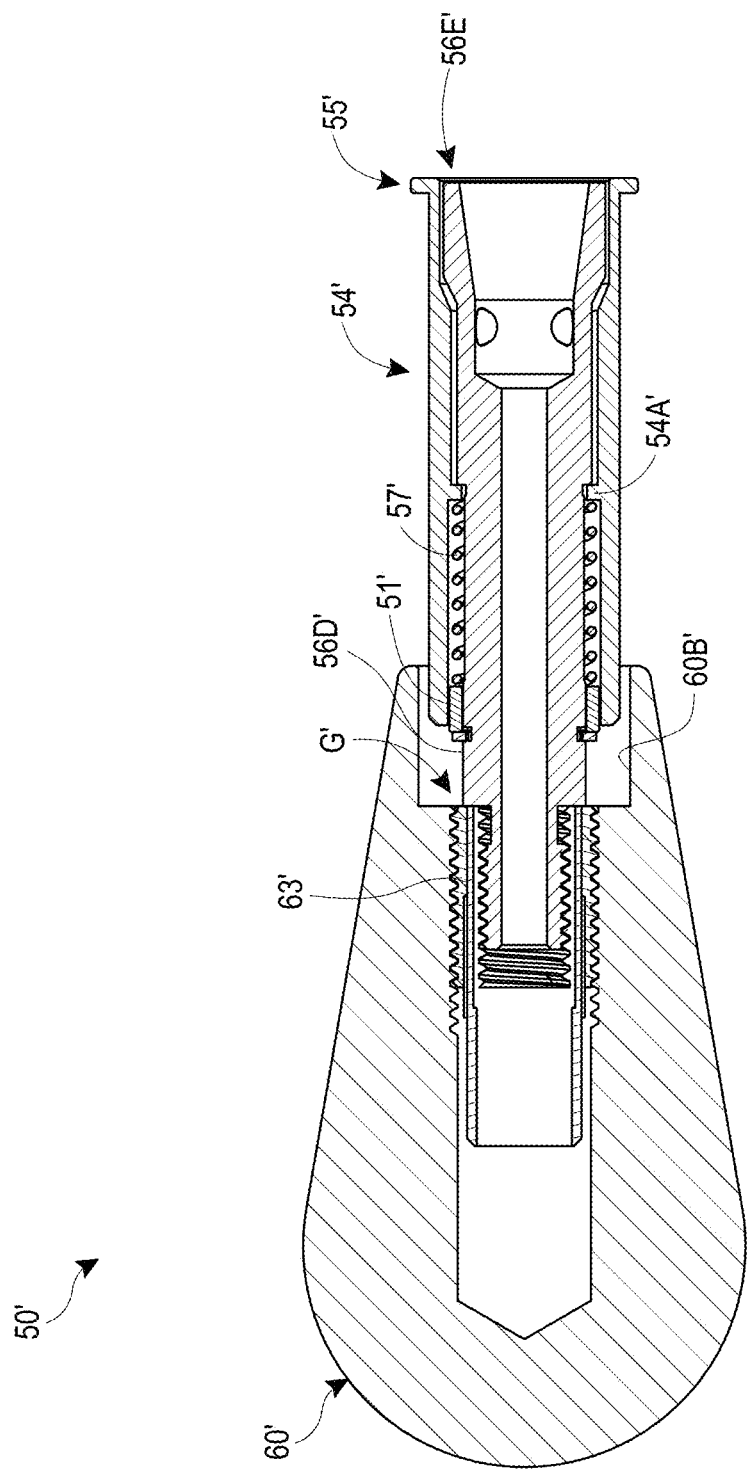
FIG. 9C is a cross-sectional side vice of the joystick assembly of FIG. 9A.

FIG. 9A-9C illustrate another joystick assembly 50' for use with the controller 100 and that can be decoupled from the controller 100 (e.g., during storage or travel of the controller 100). The joystick assembly 50' is constructed similar to the joystick assembly 50 shown in FIGS. 6-8, except as noted below. Thus the reference numerals used to designate the various components of the joystick assembly 50' are identical to those used for identifying the corresponding components of the joystick assembly 50 in FIGS. 6-8, except that a "'" has been added to the reference numerals.

The joystick assembly 50' includes a top shaft 56' and a collar or sleeve 54' that is movably mounted (e.g., slidably mounted) over the top shaft 56'. The collar or sleeve 54' is optionally spring loaded relative to the top shaft 56' in the same manner described above for the joystick assembly 50. The collar or sleeve 54' is optionally cylindrical with a constant outer diameter D along the length of the sleeve 54'.

The top shaft 56' has a proximal end 56B' that extends within and couples to the head 60' such that an annular gap G is defined between an inner circumferential surface 60B' of the head 60' and an outer surface 56D' of a proximal portion of the top shaft 56'. The head 60' can be elongated (e.g., bat shaped) with a wider proximal portion that tapers toward a relatively narrower distal portion. The top shaft 56' also has a distal end 56E' that removably receives a proximal portion of the base shaft 52. The sleeve 54' can have a flange 55' at its distal end. The flange 55' can have the same dimensions as the flange 55, and can retain the dust cover 46 when the joystick assembly 50' is decoupled from the controller 100'. The sleeve 54' defines a quick release or quick disconnect fitting (e.g., a ball-lock quick disconnect) that removably couples to the distal end of the top shaft 56' to the base shaft 52. The quick release or quick disconnect structure can be identical to that described above for the joystick assembly 50.

The proximal end of the sleeve 54' can extend further into the annular gap G when the sleeve 54' is moved in a proximal direction relative to the top shaft 56' (e.g., to decouple the top shaft 56' from the base shaft 52). As best shown in FIGS. 9B-9C, a spring 57' is disposed over at least a portion of the top shaft 56' and between a collar 51' disposed over the top shaft 56' and an inner shoulder 54A' of the collar or sleeve 54'. The spring 57' is disposed between the inner shoulder 54A' and a clip (e.g., e-clip) 59' disposed in a recess 56C' of the top shaft 56' at a location adjacent the collar 51'. The clip 59' is optionally disposed on a portion of the top shaft 56' that is disposed in the head 60' when the top shaft 56' is coupled to the head 60'. The sleeve 54' can move from a distal biased position (e.g., where the proximal end of the sleeve 54' is in the annular gap G in the head 60') to a proximal position (e.g., where the proximal end of the sleeve 54' is further inside the annular gap G in the head 60') to allow the top shaft 56' to decouple from the base shaft 52. The top shaft 56' can have a threaded portion 56B' that removably threads on to a head 60' (e.g., threads into a threaded portion 63' in the ball 60').

In use, when the sleeve 54' is in the biased position and the top shaft 56' is disposed over and coupled to the base shaft 52, the user can operate the joystick assembly 50' by moving the head 50' and the motion can be transferred to the base shaft 52 and the electronics in the controller 100'. In some instances, gamers hold the head 60' with the palm of their hand and wrap their fingers on the underside of the head 60', placing them on either side of the sleeve 54'. Advantageously, the sleeve 54' can have a constant diameter D' that provides a continuous (e.g., smooth) surface for contact with the user's fingers. This inhibits discomfort to the user during operation, which may occur if there was a change in diameter that the user's fingers engaged, such as the transition between the proximal end of the collar 54 and the top shaft 56 in the joystick assembly 50.

When the sleeve 54' is slid toward the proximal position (acting against the spring force), the top shaft 56' decouples from the base shaft 52 (in a similar manner described above for the joystick assembly 50), allowing the top shaft 56' to be pulled away from the base shaft 52 to facilitate storage and/or travel of the controller 100.

Figure 10A:
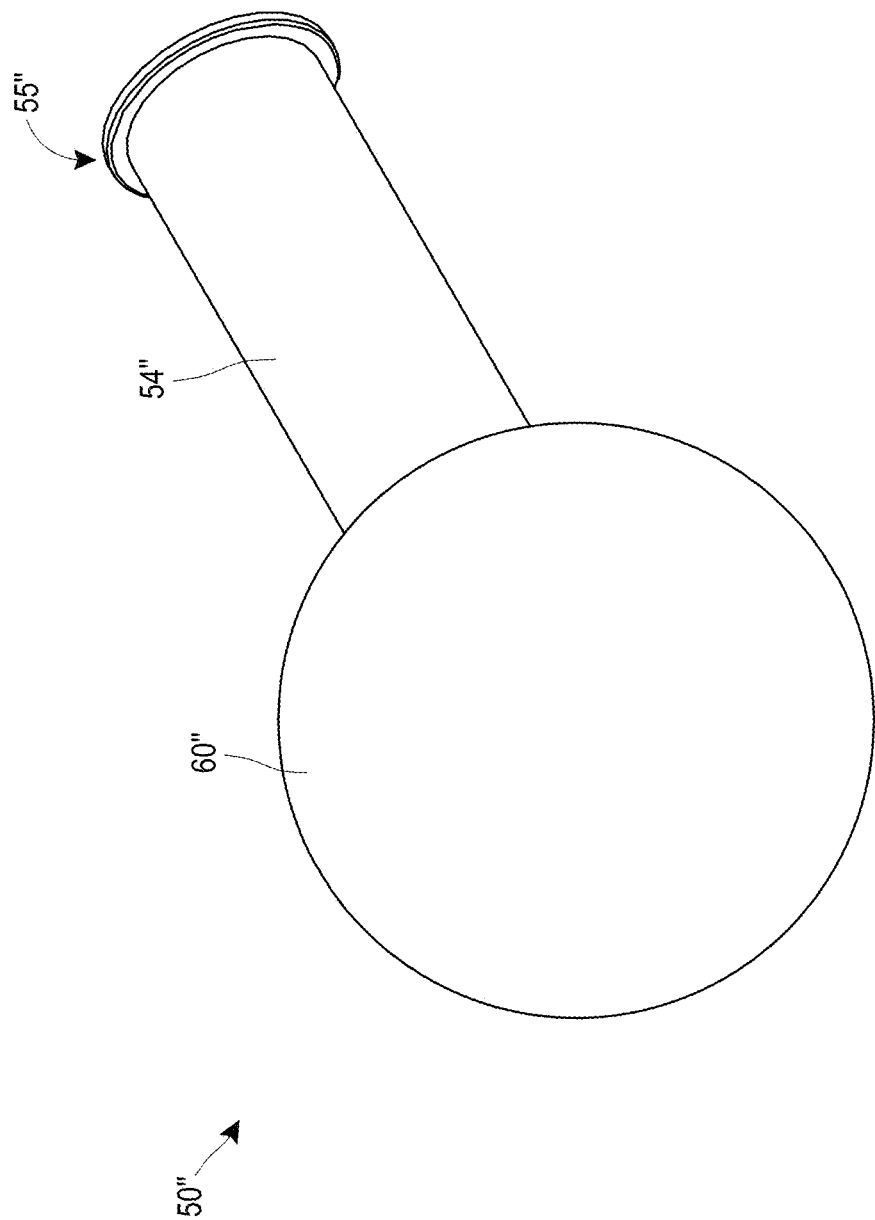
FIG. 10A is a perspective view of another joystick assembly.
Figure 10B:
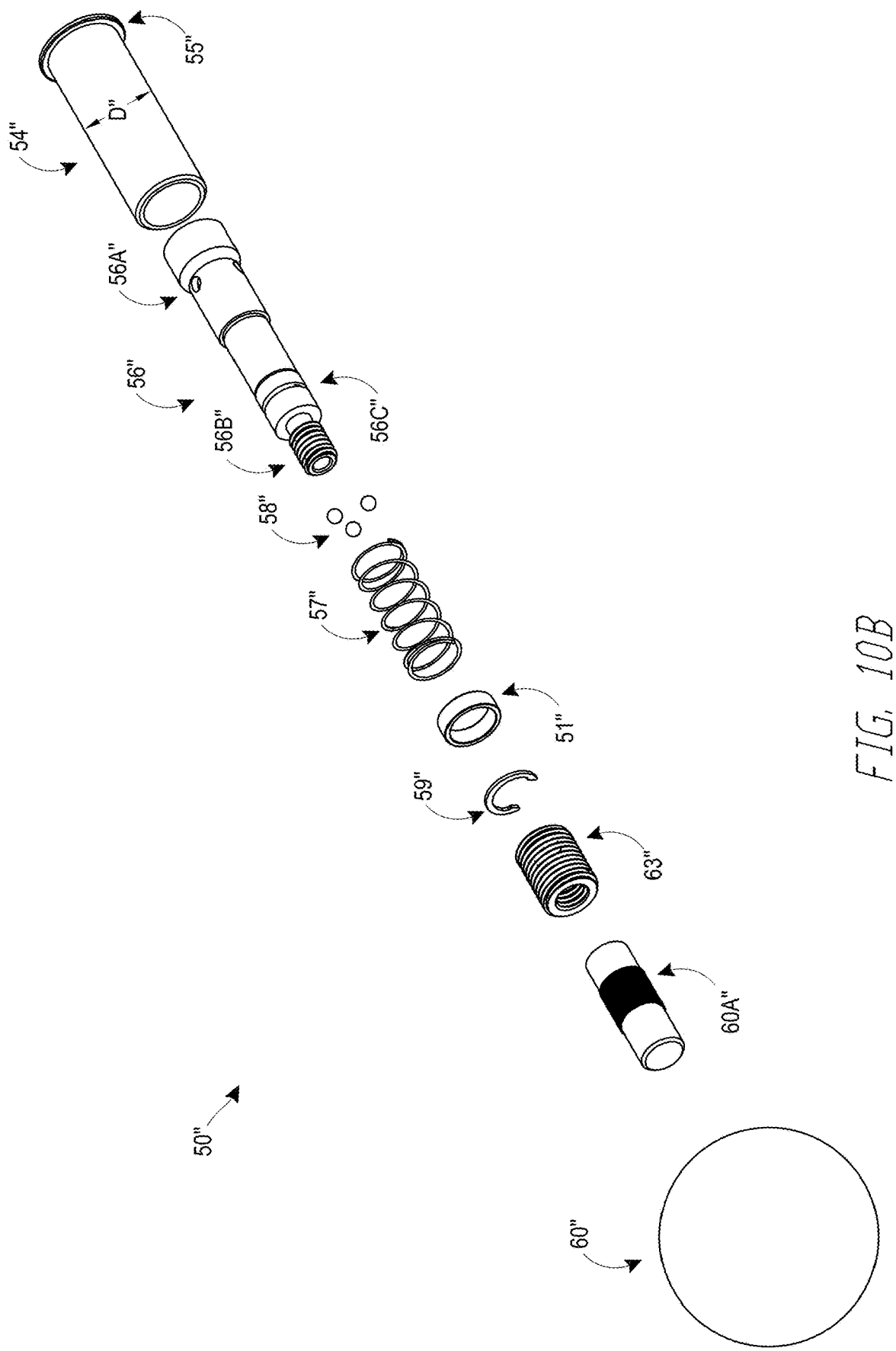
FIG. 10B is an exploded view of the joystick assembly of FIG. 10A.
Figure 10C:
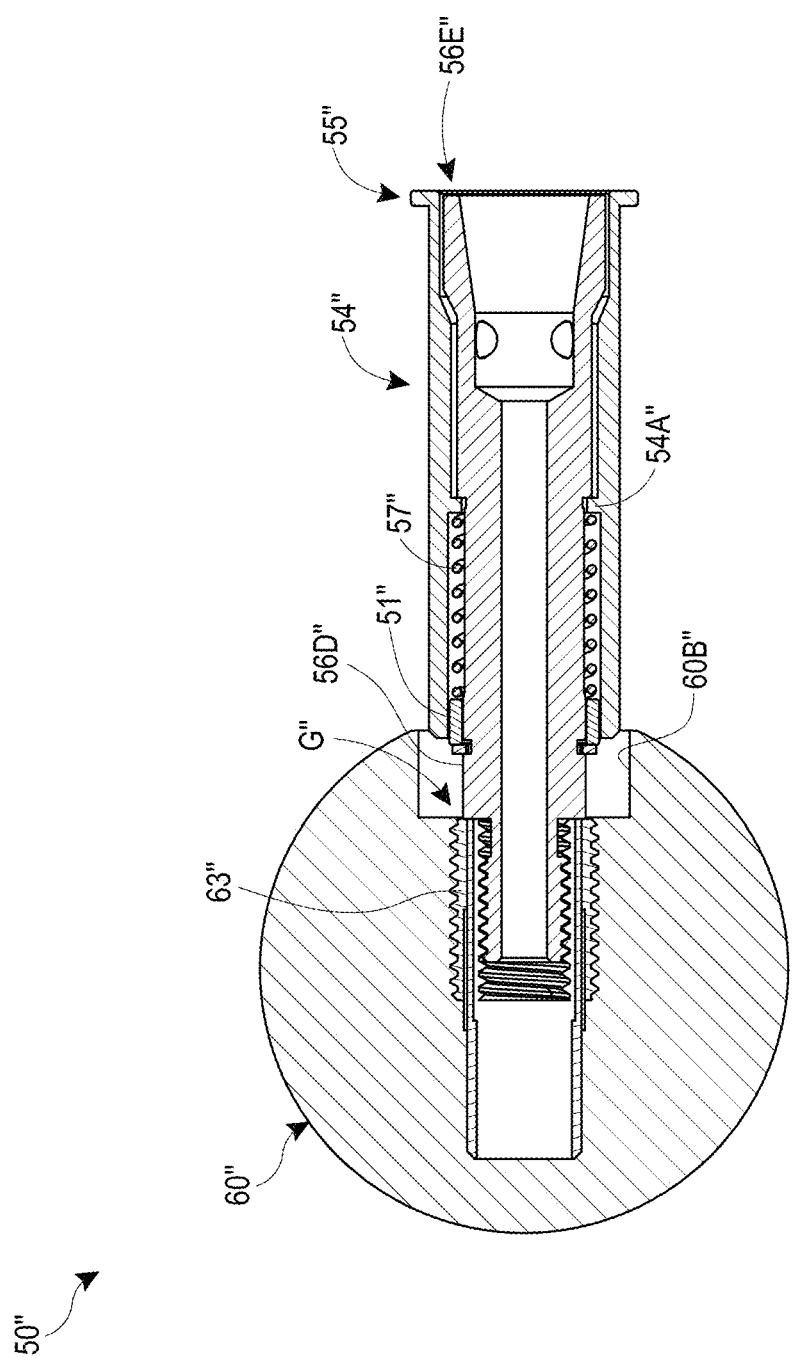
FIG. 10C is a cross-sectional side vice of the joystick assembly of FIG. 10A.

FIGS. 10A-10C illustrate another joystick assembly 50" for use with the controller 100 and that can be decoupled from the controller 100 (e.g., during storage or travel of the controller 100). The joystick assembly 50" is constructed similar to the joystick assembly 50' shown in FIGS. 9A-9C, except as noted below. Thus the reference numerals used to designate the various components of the joystick assembly 50" are identical to those used for identifying the corresponding components of the joystick assembly 50' in FIGS. 9A-9C, except that a "''" has been added to the reference numerals.

The joystick assembly 50" includes a head 60" that is shaped differently than the head 60' of the joystick assembly 50'. The head 60" can be a spherical ball. As with the head 60', the head 60" has a cavity that removably receives and couples to a proximal end of the top shaft 56", such that an annular gap G" is defined between an inner circumferential surface 60B" of the head 60" and an outer surface 56D" of a proximal portion of the top shaft 56".

As with the joystick assembly 50', the joystick assembly 50" has a sleeve 54' with a constant diameter D" that provides a continuous (e.g., smooth) surface for contact with the user's fingers. This inhibits discomfort to the user during operation, which may occur if there was a change in diameter that the user's fingers engaged, such as the transition between the proximal end of the collar 54 and the top shaft 56 in the joystick assembly 50.

Figure 11A:
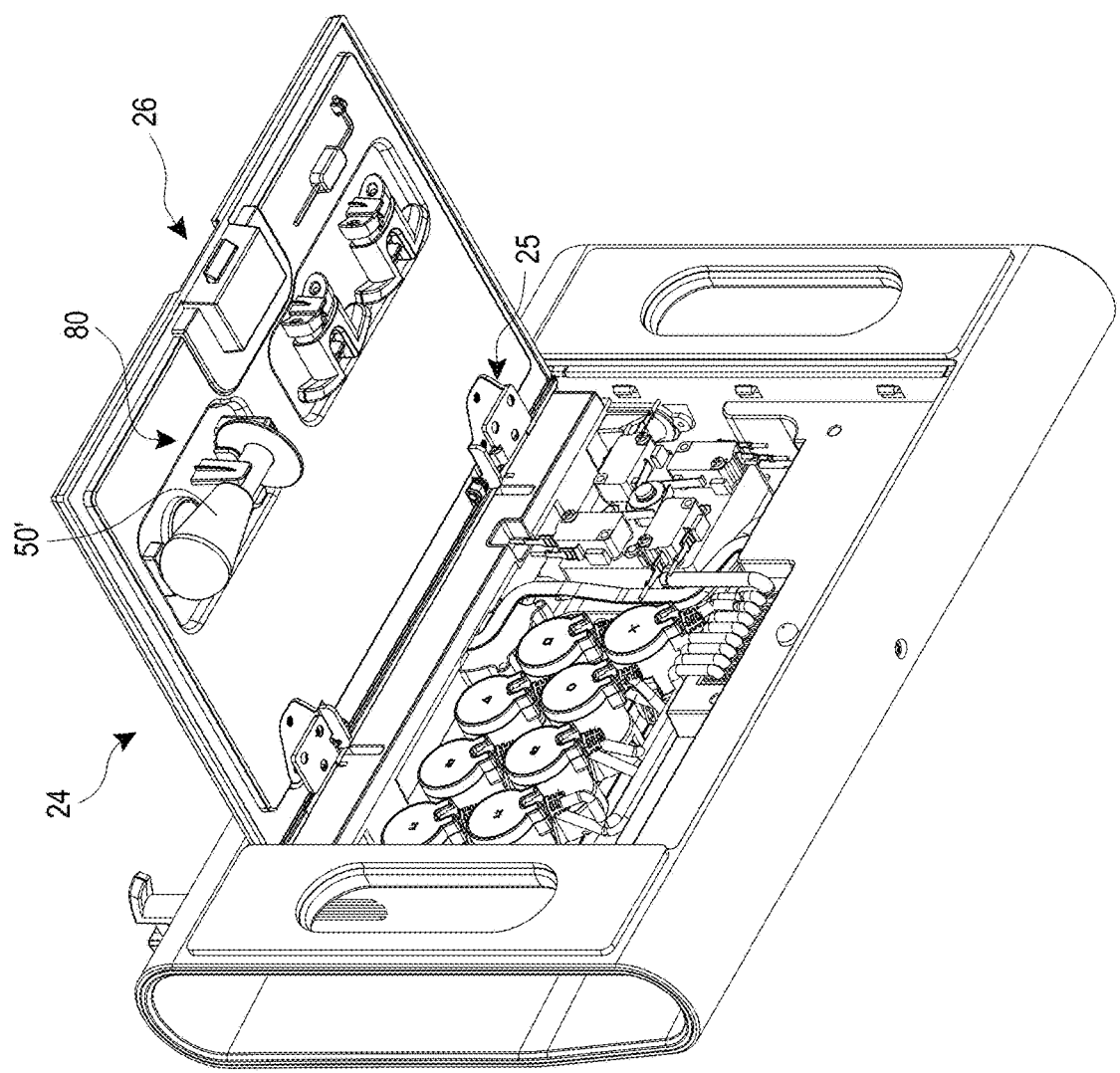
FIG. 11A is a view of a bottom cover of the video game controller of FIG. 1 in an open position relative to the body of the video game controller, showing a removable stick stored on the cover.
Figure 11B:
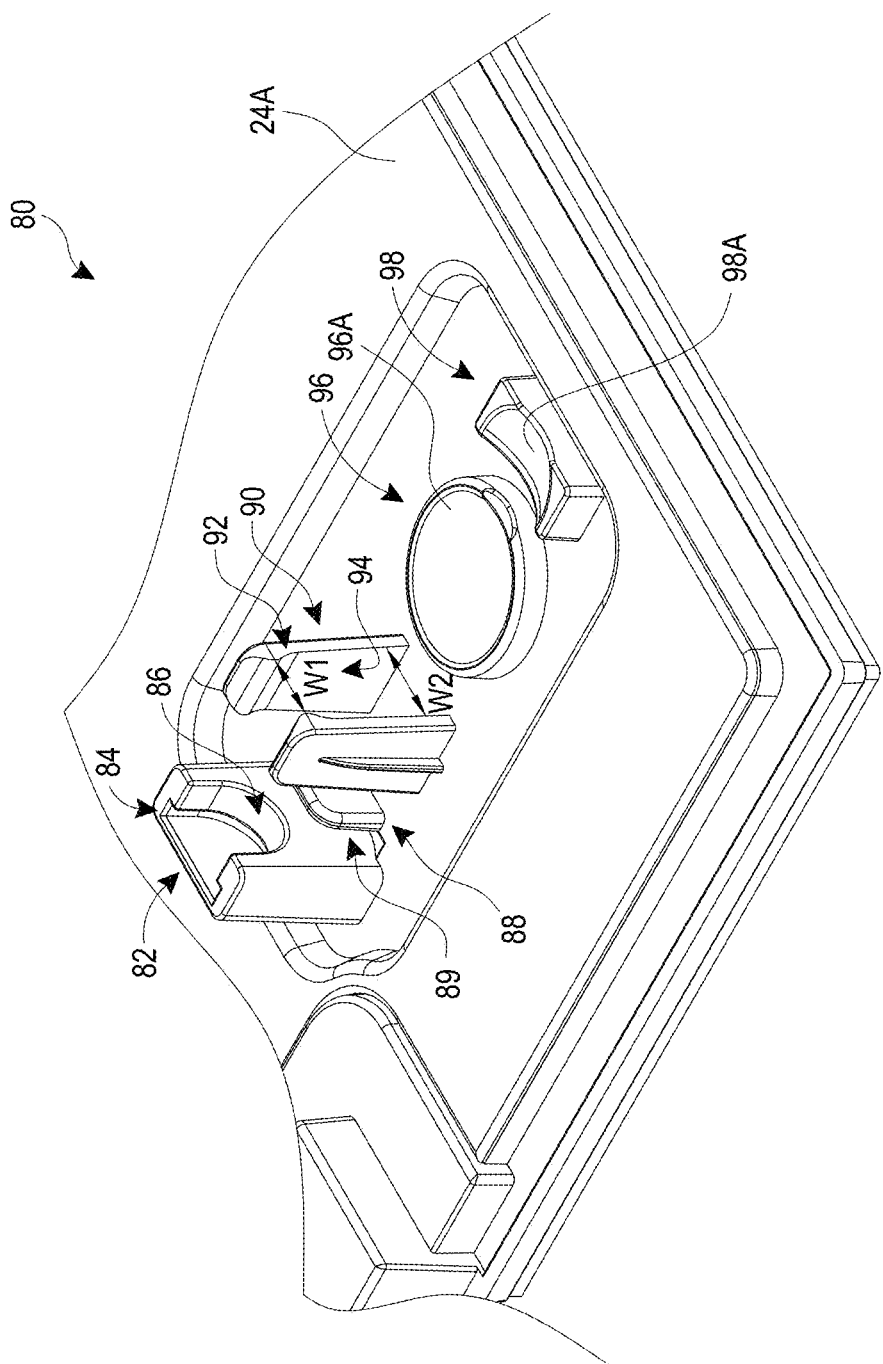
FIG. 11B shows the bottom cover of FIG. 11A with the removable stick removed.

FIGS. 11A-11B show the bottom cover 24 of the controller 100 in an open position, relative to the rest of the controller 100. An inner surface 24A of the bottom cover 24 can have a mount assembly 80 to which the joystick assembly 50, 50', 50" can be coupled to store it (e.g., when traveling with the controller 100).

The mount assembly 80 optionally includes a support post 82 with an opening 84 at a proximal end thereof and a curved shoulder 86 adjacent the opening 84. The opening 84 is sized to receive and retain the flange 55, 55' of the sleeve 54, 54', 54" therein, and the curved shoulder 86 is sized to contact and support the sleeve 54, 54', 54" thereon. At least a portion of the curved shoulder 86 can be defined by a radius substantially equal to the outer radius that defines the outer surface of the sleeve 54, 54', 54".

The mount assembly 80 optionally includes a wall 88 spaced apart from a surface of the support post 82 to define a gap 89 therebetween. The gap 89 has a width greater than a thickness of the dust cover 46. The gap 89 receives the dust cover 46 therein when the sleeve 54, 54', 54" is disposed on the curved shoulder 86 to advantageously retain the dust cover 46.

The mount assembly 80 optionally includes a pair of resilient clips 90 spaced apart from each other and sized to securely receive the sleeve 54, 54', 54" therebetween. Each of the clips 90 has a protrusion 92 at a proximal end that protrudes from an inner facing surface 94. A distance W1 between the clips 90 at the location of the protrusions 92 is smaller than a distance W2 between the inner facing surfaces 94.

The mount assembly 80 optionally includes a first support base 96 and optionally includes a second support base 98. The first support base 96 can have a curved support surface 96A. Optionally, the curved support surface 96A is a spherical surface. Optionally, the spherical surface can be defined by a radius substantially equal to a radius that defines an outer surface of the spherical head 60". The second support base 98 can have a curved support surface 98A. Optionally, the curved support surface 98A has substantially the same curvature as at least a portion of the head 60' that has a bat shape.

In use, the mount assembly 80 can securely hold a joystick assembly 50, 50', 50", such as a replacement joystick assembly or a joystick assembly having a different shape. For example, the joystick assembly 50' with the bat shape can be stored on the mount assembly 80 when the user has coupled the joystick assembly 50" with the spherical head to the controller 100 for use, and vice versa. Advantageously, the mount assembly 80 securely holds the joystick assembly 50, 50', 50" thereon, thereby inhibiting its loss or misplacement. Additionally, the mount assembly 80 advantageously fixedly holes the joystick assembly 50, 50', 50" and prevents it from rattling in the housing (e.g., while the user is operating the controller 100). Another advantage is that the mount assembly 80 securely holds the joystick assembly 50, 50', 50" irrespective of whether it has a spherical head 60, 60" or an elongate bat-shaped head 60' via the first and second support bases 96, 98.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. A removable joystick assembly for use with a video game controller, comprising:
    a joystick head;
    a shaft operatively coupled to the joystick head and extending to a distal end, a proximal portion of the shaft radially spaced apart from an inner surface of a distal portion of the joystick head to define an annular gap therebetween, the shaft having a central bore and a plurality of openings in a distal wall portion that at least partially defines the central bore;
    a sleeve movably coupled over the shaft and spring loaded relative to the shaft, the sleeve extending between a proximal end and a distal end and having a continuous outer surface between the proximal and distal ends of the sleeve; and
    a plurality of balls disposed at least partially between the sleeve and the shaft and configured to extend at least partially through the plurality of openings in the shaft, wherein the sleeve is configured to move between a first position and a second position relative to the shaft, wherein in the first position the distal end of the sleeve is generally aligned with the distal end of the shaft and the plurality of balls at least partially protrude through the openings and into the central bore allowing the shaft to couple to a base shaft, and wherein in the second position the proximal end of the sleeve is disposed in the annular gap and the distal end of the sleeve is located proximal of the distal end of the shaft to thereby allow the plurality of balls to move out of the openings to allow decoupling of the shaft from the base shaft.

2. The assembly of claim 1, wherein the shaft is removably coupleable to the joystick head.

3. The assembly of claim 2, wherein the shaft is threadably coupleable to the joystick head.

4. The assembly of claim 2, wherein the sleeve is cylindrical and has a constant outer diameter along substantially its entire length.

5. The assembly of claim 2, wherein the joystick head has an elongated shape.

6. The assembly of claim 2, further comprising a spring radially interposed between the shaft and the sleeve, wherein the spring biases the sleeve toward the first position.

7. The assembly of claim 2, wherein in the second position the plurality of balls are configured to move into an annular gap between the shaft and the sleeve to allow decoupling of the shaft from the base shaft.

8. A kit for a removable joystick assembly for use with a video game controller, comprising:
a base shaft with a circumferential recess at a proximal end of the base shaft; and
a joystick assembly removably coupleable to the base shaft, the joystick assembly comprising
a joystick head;
a shaft operatively coupled to the joystick head and extending to a distal end, a proximal portion of the shaft radially spaced apart from an inner surface of a distal portion of the joystick head to define an annular gap therebetween, the shaft having a central bore and a plurality of openings in a distal wall portion that at least partially defines the central bore;
a sleeve movably coupled over the shaft and spring loaded relative to the shaft, the sleeve extending between a proximal end and a distal end and having a continuous outer surface between the proximal and distal ends of the sleeve; and
a plurality of balls disposed at least partially between the sleeve and the shaft and configured to extend at least partially through the plurality of openings in the shaft,
wherein the sleeve is configured to move between a first position and a second position relative to the shaft, wherein in the first position the distal end of the sleeve is generally aligned with the distal end of the shaft and the plurality of balls at least partially protrude through the openings and into the central bore allowing the shaft to couple to a base shaft, and wherein in the second position the proximal end of the sleeve is disposed in the annular gap and the distal end of the sleeve is located proximal of the distal end of the shaft to thereby allow the plurality of balls to move out of the openings to allow decoupling of the shaft from the base shaft.

9. The kit of claim 8, wherein the shaft is removably coupleable to the joystick head.

10. The kit of claim 9, wherein the shaft is threadably coupleable to the joystick head.

11. The kit of claim 8, wherein the sleeve is cylindrical and has a constant outer diameter along substantially its entire length.

12. The kit of claim 8, wherein the joystick head has an elongated shape.

13. The kit of claim 8, further comprising a spring radially interposed between the shaft and the sleeve, wherein the spring biases the sleeve toward the first position.

14. The kit of claim 8, wherein in the second position the plurality of balls are configured to move into an annular gap between the shaft and the sleeve to allow decoupling of the shaft from the base shaft.

15. The kit of claim 8, wherein in the first position the plurality of balls extend at least partially into the circumferential recess of the base shaft.

16. In combination, a video game controller comprising a housing on which a user can rest their wrists while operating the controller and a removable joystick assembly, comprising:
a base shaft with a circumferential recess at a proximal end of the base shaft and a distal end coupled to a joystick unit in the housing; and
a joystick assembly removably coupleable to the base shaft, comprising
a joystick head;
a shaft operatively coupled to the joystick head and extending to a distal end, a proximal portion of the shaft radially spaced apart from an inner surface of a distal portion of the joystick head to define an annular gap therebetween, the shaft having a central bore and a plurality of openings in a distal wall portion that at least partially defines the central bore;
a sleeve movably coupled over the shaft and spring loaded relative to the shaft, the sleeve extending between a proximal end and a distal end and having a continuous outer surface between the proximal and distal ends of the sleeve; and
a plurality of balls disposed at least partially between the sleeve and the shaft and configured to extend at least partially through the plurality of openings in the shaft,
wherein the sleeve is configured to move between a first position and a second position relative to the shaft, wherein in the first position the distal end of the sleeve is generally aligned with the distal end of the shaft and the plurality of balls at least partially protrude through the openings and into the central bore allowing the shaft to couple to a base shaft, and wherein in the second position the proximal end of the sleeve is disposed in the annular gap and the distal end of the sleeve is located proximal of the distal end of the shaft to thereby allow the plurality of balls to move out of the openings to allow decoupling of the shaft from the base shaft.

17. The combination of claim 16, wherein the shaft is removably coupleable to the joystick head.

18. The combination of claim 17, wherein the shaft is threadably coupleable to the joystick head.

19. The combination of claim 16, wherein the sleeve is cylindrical and has a constant outer diameter along substantially its entire length.

20. The combination of claim 16, further comprising a spring radially interposed between the shaft and the sleeve, wherein the spring biases the sleeve toward the first position such that the plurality of balls extend at least partially into the circumferential recess of the base shaft.

21. The combination of claim 16, wherein in the second position the plurality of balls are configured to move into an annular gap between the shaft and the sleeve to allow decoupling of the shaft from the base shaft.

* * * * *